(12) United States Patent
Macko (10) Patent No.: US 11,766,072 B2
(45) Date of Patent: Sep. 26, 2023

(54) E-VAPOR DEVICE WITH BIMETALLIC ACTUATOR FOR OPENING AND SEALING RESERVOIR

(71) Applicant: Altria Client Services LLC, Richmond, VA (US)

(72) Inventor: Jason Andrew Macko, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 5 days.

(21) Appl. No.: 17/381,573

(22) Filed: Jul. 21, 2021

(65) Prior Publication Data

US 2021/0345678 A1     Nov. 11, 2021

Related U.S. Application Data

(63) Continuation of application No. 15/714,096, filed on Sep. 25, 2017, now Pat. No. 11,096,423.

(51) Int. Cl.
| | | |
|---|---|---|
| *A24F 13/00* | (2006.01) | |
| *A24F 40/485* | (2020.01) | |
| *F16K 31/00* | (2006.01) | |
| *F22B 1/28* | (2006.01) | |
| *H05B 3/42* | (2006.01) | |
| *A24F 40/10* | (2020.01) | |

(52) U.S. Cl.
CPC .......... *A24F 40/485* (2020.01); *F16K 31/002* (2013.01); *F22B 1/284* (2013.01); *H05B 3/42* (2013.01); *A24F 40/10* (2020.01)

(58) Field of Classification Search
CPC ...................................................... A24F 47/00
USPC .................................................. 131/328–329
See application file for complete search history.

(56) References Cited

U.S. PATENT DOCUMENTS

| | | | |
|---|---|---|---|
| 3,441,029 | A | 4/1969 | Wall |
| 4,867,182 | A | 9/1989 | Roberts et al. |
| 4,947,874 | A | 8/1990 | Brooks et al. |
| 6,763,620 | B1 | 7/2004 | Voss et al. |
| 7,181,874 | B2 | 2/2007 | Uebele et al. |

(Continued)

FOREIGN PATENT DOCUMENTS

| | | |
|---|---|---|
| CN | 104397875 A | 3/2015 |
| CN | 104571190 A | 4/2015 |

(Continued)

OTHER PUBLICATIONS

Russian Office Action for corresponding Russian Application No. 2020114221 dated Dec. 1, 2021 and English translation thereof.

(Continued)

*Primary Examiner* — Phuong K Dinh
(74) *Attorney, Agent, or Firm* — Harness, Dickey & Pierce, P.L.C.

(57) ABSTRACT

An e-vapor device may include a reservoir, a heater, and a bimetallic actuator. The reservoir is configured to hold a pre-vapor formulation. The reservoir defines an outlet configured to release the pre-vapor formulation therefrom. The heater is configured to heat the pre-vapor formulation released from the reservoir to generate a vapor. The bimetallic actuator may be configured to seal the outlet of the reservoir when vaping is not occurring and configured to unseal the outlet when vaping is occurring.

20 Claims, 9 Drawing Sheets

(56) References Cited

U.S. PATENT DOCUMENTS

| | | | |
|---|---|---|---|
| 7,785,098 | B1 | 8/2010 | Appleby et al. |
| 7,997,280 | B2 | 8/2011 | Rosenthal |
| 8,091,558 | B2 | 1/2012 | Martzel |
| 8,291,918 | B2 | 10/2012 | Magnon |
| 8,733,346 | B2 | 5/2014 | Rinker |
| 8,925,555 | B2 | 1/2015 | Monsees et al. |
| 9,408,416 | B2 | 8/2016 | Monsees et al. |
| 2003/0098612 | A1* | 5/2003 | Maluf .................. B81B 3/0024 303/119.1 |
| 2013/0213418 | A1* | 8/2013 | Tucker ................... A24F 40/42 131/328 |
| 2016/0021931 | A1 | 1/2016 | Hawes et al. |
| 2016/0058070 | A1 | 3/2016 | Hearn |
| 2017/0258139 | A1 | 9/2017 | Rostami et al. |
| 2019/0001086 | A1 | 1/2019 | Garthaffner et al. |
| 2019/0053981 | A1* | 2/2019 | Niznik ................... G01K 13/02 |
| 2019/0289916 | A1* | 9/2019 | Bowen ................... A24F 13/04 |

FOREIGN PATENT DOCUMENTS

| | | | |
|---|---|---|---|
| CN | 104397875 | B | 3/2016 |
| GB | 2511566 | A | 9/2014 |
| JP | H07167378 | A | 7/1995 |
| KR | 10-2020-0021463 | A | 2/2020 |
| KR | 10-2020-0057712 | A | 5/2020 |
| KR | 10-2020-0074146 | A | 6/2020 |
| RU | 2324779 | C2 | 5/2008 |
| SE | 0806216 | * | 12/1997 |
| WO | WO-2009015888 | A1 | 2/2009 |
| WO | WO-2012164033 | A1 | 12/2012 |
| WO | WO-2014/045024 | A2 | 3/2014 |
| WO | WO-2015/097005 | A1 | 7/2015 |
| WO | WO-2016/156213 | A1 | 10/2016 |
| WO | WO-2016/193365 | A1 | 12/2016 |
| WO | WO-2017/011419 | A1 | 1/2017 |
| WO | WO-2018/071337 | A1 | 4/2018 |

OTHER PUBLICATIONS

BR Office Action for corresponding Brazilian Application No. 1120200042935 dated Jul. 21, 2022 and English translation thereof.
RU Office Action for corresponding Russian Application No. 2020114221 dated Mar. 28, 2022 and English translation thereof.
CN Office Action for corresponding Chinese Application No. 201880056987.5 dated Dec. 15, 2022 and English translation thereof.
KR Office Action for corresponding Korean Application No. 10-2020-7008227 dated Jan. 5, 2023 and English translation thereof.
International Search Report and Written Opinion for corresponding Application No. PCT/EP2018/075669 dated Jan. 4, 2019.
International Preliminary Report on Patentability for corresponding PCT Application No. PCT/EP2018/075669 dated Sep. 25, 2019.
JP Office Action for corresponding Japanese Application No. 2020-537865 dated Oct. 17, 2022 and English translation thereof.
KR Notice of Allowance for corresponding Korean Application No. 10-2020-7008227 dated Jul. 11, 2023 and English translation thereof.

* cited by examiner

E-VAPOR DEVICE WITH BIMETALLIC ACTUATOR FOR OPENING AND SEALING RESERVOIR

CROSS-REFERENCE TO RELATED APPLICATIONS

The present application is a continuation of and claims priority under 35 U.S.C. §§ 120/121 to U.S. patent application Ser. No. 15/714,096, filed on Sep. 25, 2017, the entire contents of which are hereby incorporated by reference.

BACKGROUND

Field

The present disclosure relates to e-vapor devices having reservoirs containing a pre-vapor formulation.

Description of Related Art

Electronic vapor devices are electrically-powered articles configured to vaporize a pre-vapor formulation for the purpose of producing a vapor that is drawn through an outlet of the device when a negative pressure is applied. Electronic vapor devices may also be referred to as e-vapor devices or e-vaping devices. An e-vapor device includes a reservoir configured to hold the pre-vapor formulation, a wick that is arranged in fluidic communication with the pre-vapor formulation, a heating element that is arranged in thermal proximity to the wick, and a power source configured to supply electricity to the heating element. The heating element may be in a form of a relatively thin wire that is coiled a plurality of times around the wick. Accordingly, when a current is supplied to the heating element during the operation of the e-vapor device, the wire undergoes resistive heating to vaporize the pre-vapor formulation in the wick to produce a vapor that is drawn through an outlet of the device when a negative pressure is applied.

However, when the e-vapor device is not in operation, the pre-vapor formulation may still continue to be drawn from the reservoir and into the wick. As a result, the wick may become oversaturated with the pre-vapor formulation. Consequently, when the heating element is subsequently activated during the operation of the e-vapor device after a prolonged period of time, the quality of the generated vapor may be affected.

SUMMARY

An e-vapor device may include a reservoir, a heater, and a bimetallic actuator. The reservoir may be configured to hold a pre-vapor formulation. The reservoir may define an outlet configured to release the pre-vapor formulation therefrom. The heater may be configured to heat the pre-vapor formulation released from the reservoir to generate a vapor. The bimetallic actuator may be configured to seal the outlet of the reservoir when vaping is not occurring and configured to unseal the outlet when vaping is occurring.

The bimetallic actuator is a temperature-sensitive structure configured to default to a first position when at a first temperature so as to seal the outlet of the reservoir and to deflect to a second position when at a higher second temperature so as to unseal the outlet.

The bimetallic actuator may be configured to seal the outlet of the reservoir when the first temperature is about 60° C. or less.

The bimetallic actuator may be configured to unseal the outlet of the reservoir when the second temperature is about 100° C. or more.

The bimetallic actuator may be configured to unseal the outlet of the reservoir when the heater is activated during the vaping.

The bimetallic actuator may be configured to unseal the outlet of the reservoir upon application of a current to the bimetallic actuator.

The bimetallic actuator may be configured to unseal the outlet of the reservoir based on waste heat from the heater.

The bimetallic actuator may have an engagement portion configured to mate with the outlet to seal the reservoir.

The engagement portion of the bimetallic actuator may have a conical or frustoconical shape.

The bimetallic actuator has a laminate structure including materials with different thermal expansion coefficients.

The bimetallic actuator includes a first layer bonded to a second layer. A thermal expansion coefficient of the first layer is higher than a thermal expansion coefficient of the second layer. The first layer may face the outlet of the reservoir.

The thermal expansion coefficient of the first layer may be at least $4 \times 10^{-6} K^{-1}$ more than the thermal expansion coefficient of the second layer.

The first layer of the bimetallic actuator may include copper.

The e-vapor device may further include a wick arranged to be in fluidic communication with the pre-vapor formulation released from the reservoir and in thermal contact with the heater during the vaping. The bimetallic actuator is configured to seal the outlet of the reservoir such that the pre-vapor formulation is not being continually drawn into the wick when the vaping is not occurring.

The e-vapor device may further include a power supply configured to supply a current to the heater and the bimetallic actuator.

The power supply may be a battery configured to simultaneously supply the current to the heater and the bimetallic actuator.

A method of controlling a flow of pre-vapor formulation in an e-vapor device may include sealing an outlet of a reservoir with a bimetallic actuator. The reservoir arranged within the e-vapor device and configured to hold the pre-vapor formulation. The method may also include applying a current to the bimetallic actuator to unseal the outlet of the reservoir when vaping is initiated.

The applying of the current may cause the bimetallic actuator to deflect away from the outlet to unseal the reservoir.

The sealing of the outlet of the reservoir may occur in less than a minute from when the vaping has ceased.

The sealing of the outlet of the reservoir may occur after each puff during the vaping.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
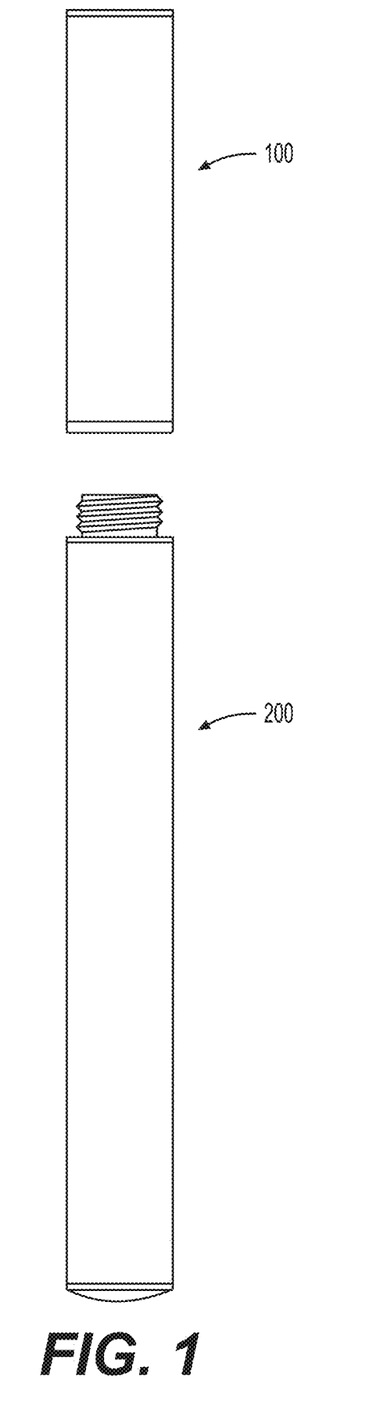
FIG. 1 is a partially disassembled view of an e-vapor device according to an example embodiment.

FIG. 1 is a partially disassembled view of an e-vapor device according to an example embodiment. Referring to FIG. 1, the e-vapor device includes a cartridge section 100 and a battery section 200. The cartridge section 100 may be connected (mechanically and electrically) to the battery section 200 via a threaded arrangement. For instance, the cartridge section 100 includes an internally threaded portion that is configured to connect to an externally threaded portion of the battery section 200. A mouthpiece is provided at an opposite end of the cartridge section 100 from the internally threaded portion. However, it should be understood that example embodiments are not limited to a threaded arrangement. In another instance, the cartridge section 100 may be connected to the battery section 200 via a bayonet arrangement. The bayonet arrangement may be as described in U.S. application Ser. No. 15/190,769, filed Jun. 23, 2016, titled "E-VAPOR DEVICE INCLUDING AT LEAST ONE OF A BAYONET CONNECTOR AND A CONNECTOR WITH A KNURLED PATTERN FOR FORMING A WELDED JUNCTION,", the disclosure of which is incorporated herein in its entirety by reference.

Figure 2:
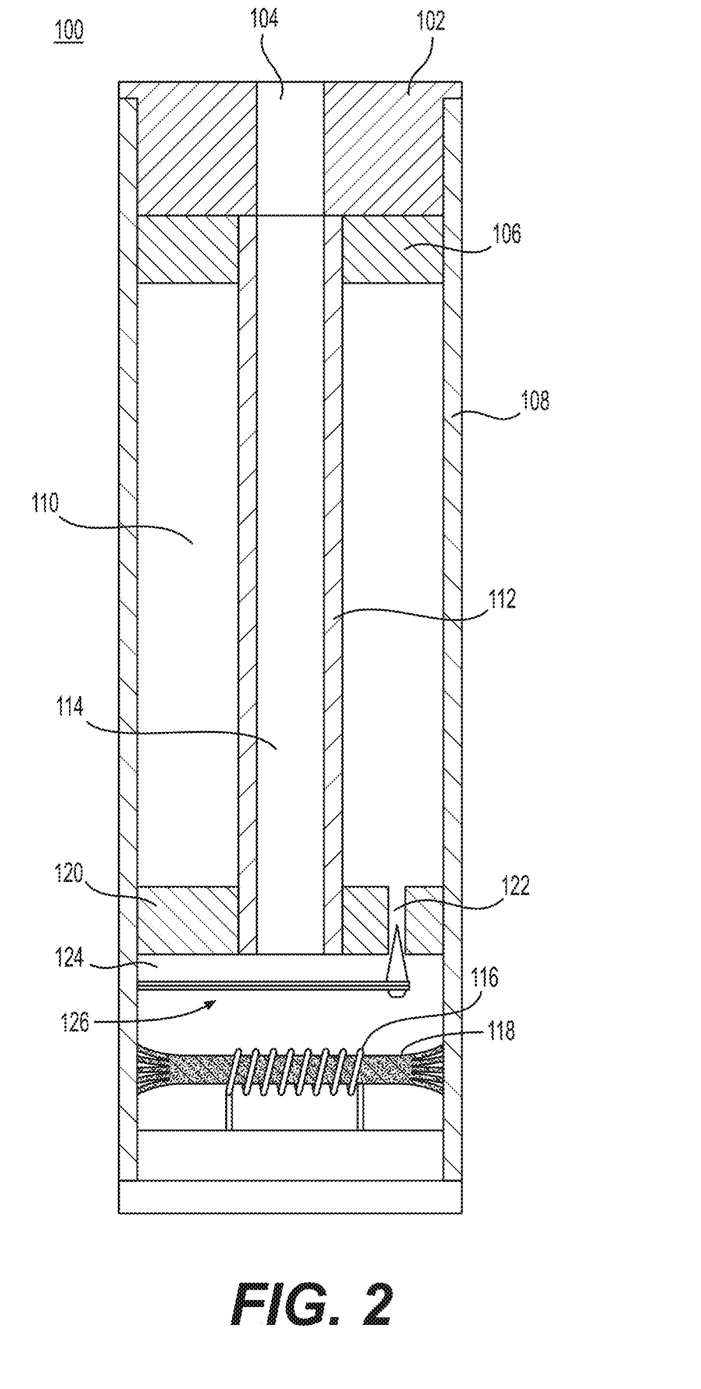
FIG. 2 is a cross-sectional view of a cartridge section of an e-vapor device according to an example embodiment.

FIG. 2 is a cross-sectional view of a cartridge section of an e-vapor device according to an example embodiment. Referring to FIG. 2, the cartridge section 100 includes a housing 108 with a chimney 112 disposed therein. The chimney 112 may be positioned by a first gasket 106 and a second gasket 120 so as to be coaxial with a central longitudinal axis of the housing 108. The reservoir 110 is an annular space defined by the inner surface of the housing 108 and the outer surface of the chimney 112 (and bounded by the first gasket 106 and the second gasket 120). The reservoir 110 is configured to contain a pre-vapor formulation. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

A mouthpiece 102 is disposed at a downstream end of the housing 108 (relative to the flow of vapor) and is structured as a mouth-end insert. The mouthpiece 102 defines an opening 104 that is aligned with a channel 114 defined by the chimney 112. During the operation of the e-vapor device, a generated vapor is drawn from the chamber 124, through the channel 114, and out the opening 104 when a negative pressure is applied to the mouthpiece 102. Although the opening 104 is shown as being in the form of a single opening, it should be understood that the opening 104 may be in the form of a plurality of openings. In addition, the plurality of openings may be angled outwards.

The opening/sealing arrangement for the reservoir 110 may be in the form of a bimetallic actuator 126. In further detail, the second gasket 120 defines an aperture 122 as an outlet for the pre-vapor formulation in the reservoir 110. The aperture 122 is plugged by the bimetallic actuator 126 when a flow of the pre-vapor formulation from the reservoir 110 is not desired (e.g., when the e-vapor device is not in operation). The bimetallic actuator 126 is configured to engage with the aperture 122 to seal the reservoir 110 and to disengage from the aperture 122 to open the reservoir 110 to release the pre-vapor formulation. The proximal end of the bimetallic actuator 126 may be embedded in the inner wall of the housing 108.

The chamber 124 is provided in the housing 108 upstream from (e.g., below) the second gasket 120. A heater 116 and a wick 118 are arranged in the chamber 124 and in proximity to the aperture 122. In particular, the wick 118 is arranged to be in fluidic communication with the pre-vapor formulation released from the reservoir 110 and in thermal contact with the heater 116 during the vaping. As a result, when the reservoir 110 is opened by the bimetallic actuator 126, the pre-vapor formulation is released through the aperture 122 and conveyed by the wick 118 to the heater 116. The heater 116 is configured to heat the pre-vapor formulation to generate a vapor. Furthermore, the bimetallic actuator 126 is configured to seal the outlet of the reservoir 110 such that the pre-vapor formulation is not being continually drawn into the wick 118 when the vaping is not occurring.

In an example embodiment, the wick 118 may be configured such that an end (e.g., right end) extends towards the aperture 122 to be closer to the released pre-vapor formulation. In addition, the length of the wick 118 may be reduced to the extent needed to adequately receive and convey the pre-vapor formulation in order to avoid excess pre-vapor formulation from being unnecessarily retained in the wick 118 (e.g., if an overly long wick is used). For instance, the end (e.g., left end) of the wick 118 farthest from the aperture 122 and not encompassed by the heater 116 may be shortened to avoid excess pre-vapor formulation from being unnecessarily retained in that section of the wick 118.

A power supply is configured to supply a current to the heater 116 and/or the bimetallic actuator 126. In an example embodiment, the power supply may be a battery (e.g., in the battery section 200) configured to simultaneously supply the current to the heater 116 and the bimetallic actuator 126.

The bimetallic actuator 126 is configured to convert a temperature change into a mechanical displacement. The heat causing the temperature change in the bimetallic actuator 126 may be indirect or direct. For instance, the e-vapor device may be configured such that, when the heater 116 is activated, the heat emanating therefrom will indirectly increase the temperature of the bimetallic actuator 126, thereby causing the bimetallic actuator 126 to bend so as to deflect away from the second gasket 120. As a result, the bimetallic actuator 126 will disengage from the aperture 122 and open the reservoir 110 to release the pre-vapor formulation.

Alternatively, an electrical lead may be directly connected to the bimetallic actuator 126 (and the heater 116). In such an instance, during the operation of the e-vapor device, a current will be supplied to the bimetallic actuator 126 (and the heater 116). The supplied current will increase the temperature of the bimetallic actuator 126, thereby causing the bimetallic actuator 126 to bend so as to deflect away from the second gasket 120. As a result, the bimetallic actuator 126 will disengage from the aperture 122 and open the reservoir 110 to release the pre-vapor formulation.

In an example embodiment, the bimetallic actuator 126 is structured as a bimetallic strip. A bimetallic strip includes two separate strips of different metals with different thermal expansion coefficients. The separate strips may be joined together along their lengths by riveting, brazing, or welding. Due to the differing thermal expansion coefficients, the separate strips will expand by different amounts when heated. Conversely, the separate strips will contract by different amounts when cooled. Because the separate strips have different amounts of expansion/contraction based on a given temperature change, the bimetallic strip will bend toward one side when heated and bend toward the opposing side when cooled.

As discussed herein and unless otherwise indicated, all references to a thermal expansion coefficient should be understood to be in connection with a linear thermal expansion coefficient, which is the fractional change in length per degree of temperature change. For the linear expansion of a material, the thermal expansion coefficient may be expressed by the following Equation 1.

$$\alpha = (1/L)(\Delta L/\Delta T) \quad (1)$$

In the above Equation 1, $\alpha$ is the thermal expansion coefficient of a material, L is the length of the material, $\Delta L$ is the change in length of the material after a temperature change, and $\Delta T$ is the temperature change. In addition, the effect of pressure is assumed to be negligible in Equation 1.

A higher thermal expansion coefficient for a material means that the material will undergo a greater amount of expansion when heated and a greater amount of contraction when cooled compared to a material with a lower thermal expansion coefficient. As a result, when a bimetallic strip is heated, the metal with the higher thermal expansion coefficient will be on the outer side of the curve. Conversely, when the bimetallic strip is cooled, the metal with the higher thermal expansion coefficient will be on the inner side of the curve.

Two separate strips of different metals with the same dimensions that are joined together to form a bimetallic strip may have a length referred to as "L" and a sideways displacement referred to as "s" (from the bending caused by a temperature change).

The bimetallic strip may be configured to have no flexure at an initial reference temperature and may be regarded as being straight. In addition, the bimetallic strip may exhibit flexing after a temperature change. The following Equation 2 may establish the relationship between the sideways displacement of the bimetallic strip after a temperature change, the thermal expansion coefficient of the bimetallic strip, the length of the bimetallic strip, the temperature change experienced by the bimetallic strip, and the thickness of the bimetallic strip.

$$s = \alpha L^2 \Delta T / t \tag{2}$$

In the above Equation 2, s is the sideways displacement of the bimetallic strip from the bending caused by a temperature change, $\alpha$ is the thermal expansion coefficient of the bimetallic strip, L is the length of the bimetallic strip, $\Delta T$ is the temperature change experienced by the bimetallic strip, and t is the thickness of the bimetallic strip.

The curvature of a bimetallic strip after a temperature change (which has no flexure at an initial reference temperature) may be expressed by the following Equation 3.

$$\kappa = \frac{6 E_1 E_2 (t_1 + t_2) t_1 t_2 \epsilon}{E_1^2 t_1^4 + 4 E_1 E_2 t_1^3 t_2 + 6 E_1 E_2 t_1^2 t_2^2 + 4 E_1 E_2 t_2^3 t_1 + E_2^2 t_2^4} \tag{3}$$

In the above Equation 3, $\kappa$ is the curvature of a bimetallic strip after a temperature change, $E_1$ is the Young's Modulus of the first material of the bimetallic strip, $t_1$ is the thickness of the first material of the bimetallic strip, $E_2$ is the Young's Modulus of the second material of the bimetallic strip, $t_2$ is the thickness of the second material of the bimetallic strip, and $\epsilon$ is the misfit strain. The misfit strain ($\epsilon$) is calculated by the following Equation 4.

$$\epsilon = (\alpha_1 - \alpha_2) \Delta T \tag{4}$$

In the above Equation 4, $\alpha_1$ is the thermal expansion coefficient of the first material of the bimetallic strip, $\alpha_2$ is the thermal expansion coefficient of the second material of the bimetallic strip, and $\Delta T$ is the temperature change based on an initial reference temperature where the bimetallic strip has no flexure.

In sum, referring back to FIG. 2, an e-vapor device may comprise a reservoir 110 configured to hold a pre-vapor formulation. The reservoir 110 may define an outlet (e.g., aperture 122) configured to release the pre-vapor formulation therefrom. A heater 116 is configured to heat the pre-vapor formulation released from the reservoir 110 to generate a vapor. A bimetallic actuator 126 is configured to seal the outlet (e.g., aperture 122) of the reservoir 110 when vaping is not occurring and configured to unseal the outlet when vaping is occurring.

The bimetallic actuator 126 is a temperature-sensitive structure configured to be in (and to default/return to) a first position when at a first temperature so as to seal the outlet of the reservoir 110. When in the first position, the bimetallic actuator 126 is configured to have a relatively straight form (e.g., no flexure). As a result, the tip of the engagement portion of the bimetallic actuator 126 will be seated in the aperture 122 so as to close the reservoir 110. When the pre-vapor formulation is in the form of a liquid, the tip of the engagement portion of the bimetallic actuator 126 and the aperture 122 need not form an airtight seal in order to close the reservoir 110. Rather, the tightness of the seal need only be adequate to preclude an outward flow based on the surface tension of the pre-vapor formulation. The bimetallic actuator 126 is configured to seal the outlet of the reservoir 110 when the first temperature is about 60° C. or less. Thus, at an ambient temperature (e.g., 25° C.), the bimetallic actuator 126 is configured to be relatively straight, with the tip of the engagement portion seated in the aperture 122 to confine the pre-vapor formulation within the reservoir 110.

Conversely, the bimetallic actuator 126 is configured to deflect to a second position when at a higher second temperature so as to unseal the outlet of the reservoir 110. When in the second position, the bimetallic actuator 126 is configured to have a curved form (e.g., downward flexure). For instance, the proximal end of the bimetallic actuator 126 that is secured to the housing 108 may remain fixed, while the strip portion of the bimetallic actuator 126 undergoes a bend from the differing thermal expansion of the materials of the strip portion, thereby causing a vertical displacement of the distal end of the bimetallic actuator 126 (which includes the engagement portion). As a result, the tip of the engagement portion of the bimetallic actuator 126 will become unseated from the aperture 122 so as to open the reservoir 110.

In an example embodiment, when in the second position, the tip of the engagement portion of the bimetallic actuator 126 is separated from the aperture 122 by a distance that is adequate to release the pre-vapor formulation from the reservoir 110 without being completely withdrawn from the aperture 122. In this example, the tip of the engagement portion of the bimetallic actuator 126 will still be overlapped by (e.g., still partially inserted in) the aperture 122 when the reservoir 110 is opened. Such a configuration may help enhance the consistency of the resealing of the reservoir 110 by reducing or preventing the occurrence of a misalignment of the tip of the engagement portion of the bimetallic actuator 126 with the aperture 122. Alternatively, it should be understood that the e-vapor device may be configured such that the tip of the engagement portion of the bimetallic actuator 126 will be completely withdrawn from the aperture 122 when the reservoir 110 is opened. The bimetallic actuator 126 is configured to unseal the outlet of the reservoir 110 when the second temperature is about 100° C. or more.

It should be understood that the change the bimetallic actuator 126 undergoes from the first position (e.g., straight) to the second position (e.g., curved) is not binary. Rather, the deflection of the bimetallic actuator 126 occurs in a transitional manner and is proportional to the temperature of the bimetallic actuator 126. For example, the bimetallic actuator 126 will begin to bend with an increase in temperature until the tip of the engagement portion becomes adequately separated from the aperture 122 (e.g., at a temperature of about 100° C.) to release the pre-vapor formulation from the reservoir 110.

The bimetallic actuator 126 is configured to unseal the outlet of the reservoir 110 when the heater 116 is activated during vaping. The timing of the unsealing may be shortly before, at the same time as, or shortly after the activation of the heater 116. In this manner, the existing pre-vapor formulation already in the wick 118 will be heated by the heater 116 to produce a vapor, and the new pre-vapor formulation released from the reservoir 110 will replenish the quantity in the wick 118 that was converted to vapor.

The e-vapor device may be configured to cause a direct heating of the bimetallic actuator 126 in order to open the reservoir 110. For instance, the bimetallic actuator 126 may be configured to unseal the outlet of the reservoir 110 upon an application of a current to the bimetallic actuator 126. In an example embodiment, electrical leads are connected to the proximal end of the strip portion of the bimetallic actuator 126, and a current is supplied (in response to an activation signal) so as to cause a resistive heating of the materials in the strip portion of the bimetallic actuator 126.

As a result, the bimetallic actuator 126 will deflect away from the aperture 122 and open the reservoir 110.

Alternatively, the e-vapor device may be configured to cause an indirect heating of the bimetallic actuator 126 in order to open the reservoir 110. For instance, the bimetallic actuator 126 may be configured to unseal the outlet of the reservoir 110 based on waste heat from the heater 116. In such an instance, when the heater 116 is activated, the heater 116 will vaporize the pre-vapor formulation in the wick 118. In addition, the excess/waste heat from the heater 116 will also increase the temperature of the bimetallic actuator 126, thereby causing a deflection which will open the reservoir 110 to release more pre-vapor formulation to replenish the quantity in the wick 118 that was vaporized.

The heater 116 and the bimetallic actuator 126 may be activated manually or automatically for vaping. For manual activation, the e-vapor device may include a button that can be depressed to send a signal to supply a current to the heater 116 and/or the bimetallic actuator 126. For automatic activation, the e-vapor device may include a sensor that detects the fulfillment of one or more conditions and, in response, sends a signal to supply a current to the heater 116 and/or the bimetallic actuator 126. The condition(s) detected by the sensor may include the application of a negative pressure on the mouthpiece 102 (e.g., via a puff sensor) and/or the gesturing of the e-vapor device which indicates an intent to vape. The gesture sensing and control may be as described in U.S. application Ser. No. 15/390,810, filed Dec. 27, 2016, titled "BODY GESTURE CONTROL SYSTEM FOR BUTTON-LESS VAPING,", the disclosure of which is incorporated herein in its entirety by reference.

The e-vapor device may also be configured to utilize a combination of manual and automatic activation. For instance, the e-vapor device may include a button that can be manually depressed to send a first signal to supply a current to preheat the heater 116 and/or the bimetallic actuator 126 in preparation for vaping (wherein the preheating will not vaporize the pre-vapor formulation or open the reservoir 110). In addition, once the requisite condition(s) have been met, a sensor (e.g., puff sensor) can send a second signal to supply a current to the heater 116 and/or the bimetallic actuator 126 to vaporize the pre-vapor formulation and open the reservoir 110.

Figure 3:
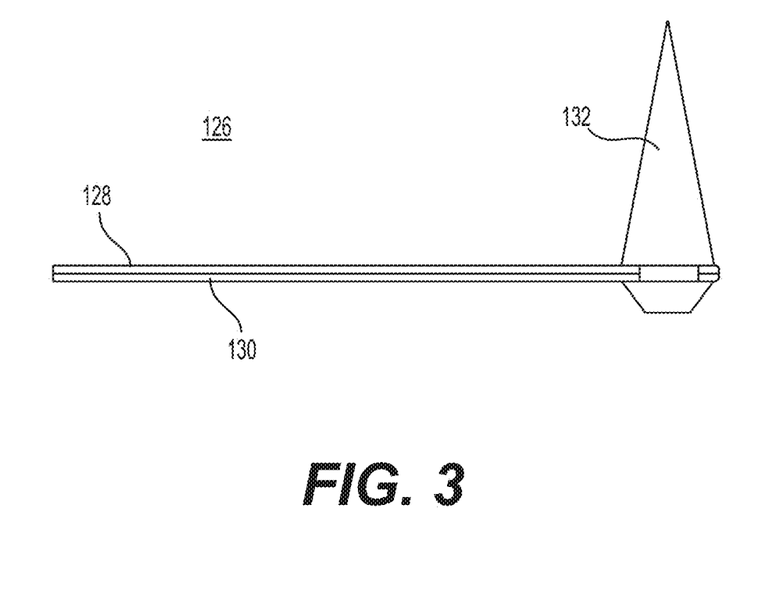
FIG. 3 is an enlarged view of the bimetallic actuator within the cartridge section of FIG. 2.

FIG. 3 is an enlarged view of the bimetallic actuator within the cartridge section of FIG. 2. Referring to FIG. 3, the bimetallic actuator 126 has a strip portion and an engagement portion 132 at the distal end of the strip portion. The length of the strip portion of the bimetallic actuator 126 may be greater than a radius of the housing 108. The engagement portion 132 of the bimetallic actuator 126 is configured to mate with the outlet of the reservoir 110 so as to form a temporary seal.

The strip portion of the bimetallic actuator 126 has a laminate structure including materials with different thermal expansion coefficients. The laminate structure of the strip portion of the bimetallic actuator 126 may include a first layer 128 bonded to a second layer 130. The first layer 128 will face the outlet (e.g., aperture 122) of the reservoir 110 when the bimetallic actuator 126 is arranged within the cartridge section 100. The thicknesses of the first layer 128 and the second layer 130 may be relatively uniform from the proximal end to the distal end of the strip portion. The thermal expansion coefficient of the first layer 128 is higher than the thermal expansion coefficient of the second layer 130. In an example embodiment, the thermal expansion coefficient of the first layer 128 is at least $4 \times 10^{-6} K^{-1}$ more than the thermal expansion coefficient of the second layer 130. For instance, the first layer 128 of the bimetallic actuator 126 may be formed of copper or an alloy thereof (e.g., brass). In addition, the second layer 130 may be formed of steel.

The engagement portion 132 may be formed of a resilient material to enhance the sealing of the reservoir 110 when the tip is seated within the aperture 122. It is also beneficial for the material of the engagement portion 132 to be non-reactive (so as to not negatively interact) with the pre-vapor formulation. For instance, the engagement portion 132 may be formed of silicone, polyethylene (e.g., HDPE, HMWPE), or polyether ether ketone (PEEK), although example embodiments are not limited thereto.

The distal end of the strip portion of the bimetallic actuator 126 may include a hole configured to receive and hold the engagement portion 132. In such an instance, the neck of the engagement portion 132 may be in the hole, while the head and the tip may be on opposite sides of the strip portion so as to form a snug-fit arrangement. The tip of the engagement portion 132 of the bimetallic actuator may have a conical or frustoconical shape. The aperture 122 may also have angled side walls that flare outwards (relative to the flow of the pre-vapor formulation from the reservoir 110) so as to correspond to the tapered surface of the tip of the engagement portion 132. In such an instance, the contact area between the aperture 122 and the engagement portion 132 will be increased, thereby enhancing the sealing of the reservoir 110.

Figure 4:
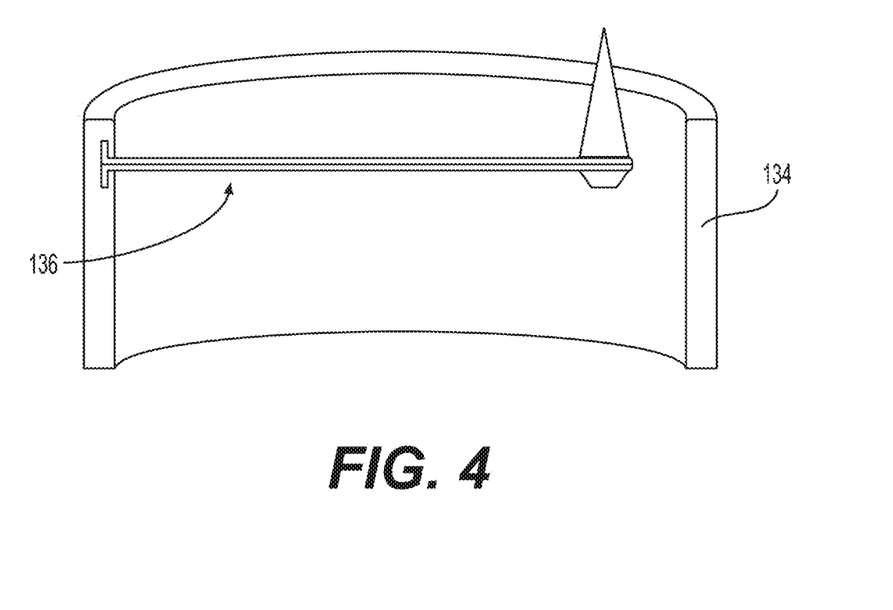
FIG. 4 is a cross-sectional view of an opening/sealing arrangement for introduction into a cartridge section of an e-vapor device according to an example embodiment.

FIG. 4 is a cross-sectional view of an opening/sealing arrangement for introduction into a cartridge section of an e-vapor device according to an example embodiment. Referring to FIG. 4, the opening/sealing arrangement may be in the form of an insert 134 with a bimetallic actuator 136 embedded within the inner sidewall of the insert 134. The insert 134 may have an annular shape, and the bimetallic actuator 136 may be as described in connection with the bimetallic actuator 126. The opening/sealing arrangement in FIG. 4 may be used in place of the bimetallic actuator 126 in the cartridge section 100 of FIG. 2.

The opening/sealing arrangement of FIG. 4 may be formed by insert molding or overmolding. For instance, the manufacturing process may include introducing the proximal end of the bimetallic actuator 136 into a mold (for forming the insert 134) and then injecting a material into the mold. The proximal end of the bimetallic actuator 136 may be in the form of a flange (or other laterally-protruding configuration) to increase the surface area interfacing with the injected material, thereby allowing the bimetallic actuator 136 to be more securely anchored in the insert 134. Once the injected material of the insert 134 solidifies, the arrangement can be removed from the mold. The material for forming the insert 134 may be pellets of a thermoplastic, such as polyether ether ketone (PEEK), that are melted and extruded into the mold.

The insert 134 has a size and shape that corresponds relatively closely to the inner surface of the housing 108. As a result, during the assembly of the cartridge section 100, the opening/sealing arrangement can be inserted into the housing 108 so as to be adjacent to the second gasket 120 and such that the engagement portion of the bimetallic actuator 136 is seated within the aperture 122. Due to the relatively close fit, the outer surface of the insert 134 and the inner surface of the housing 108 may form a friction-fit arrangement that is adequate to maintain the proper positioning of the opening/sealing arrangement.

Figure 5:
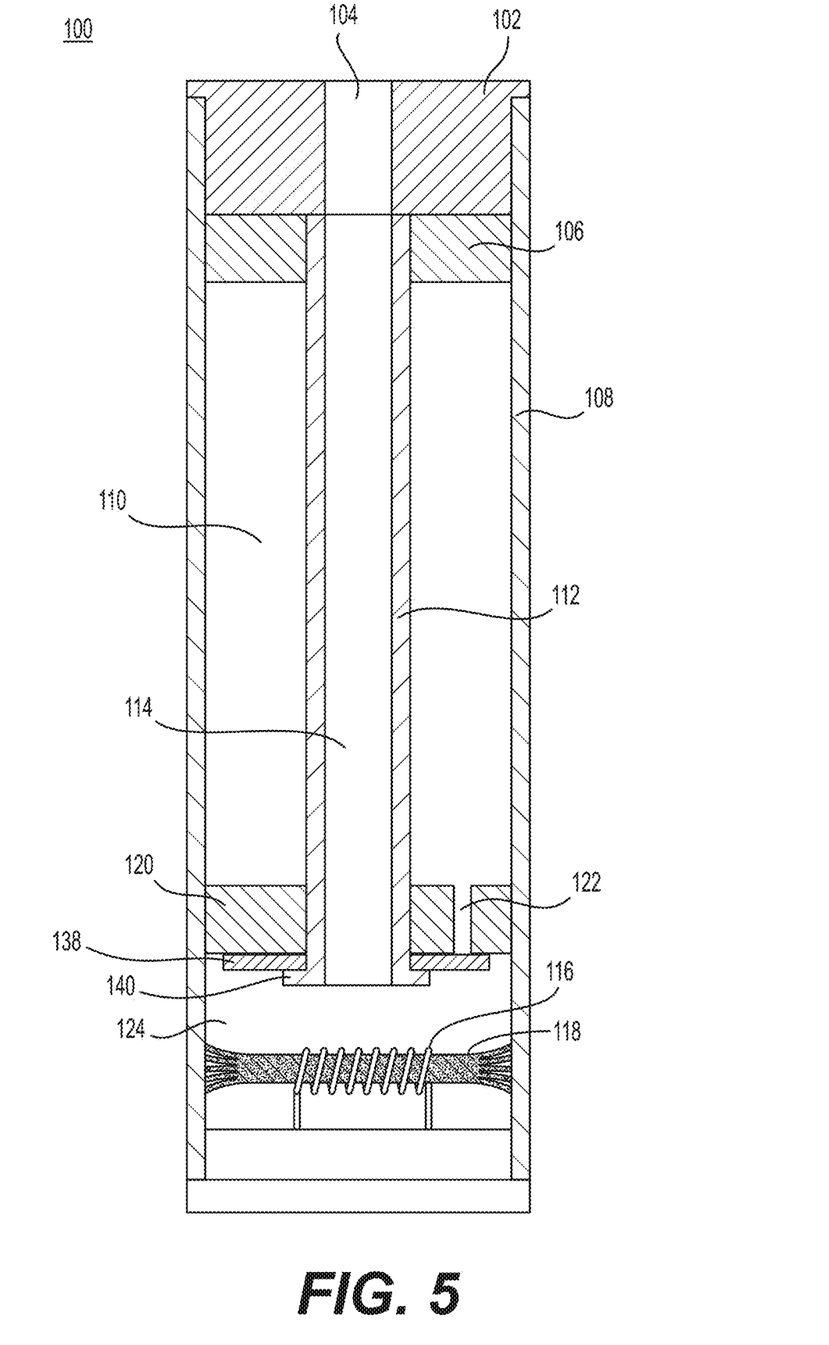
FIG. 5 is a cross-sectional view of another cartridge section of an e-vapor device according to an example embodiment.

FIG. 5 is a cross-sectional view of another cartridge section of an e-vapor device according to an example embodiment. Referring to FIG. 5, the cartridge section 100 may be as described in connection with FIG. 2, except that the opening/sealing arrangement includes a disc 138 and flange 140. The flange 140 is configured to support and to position the disc 138 against the second gasket 120. The flange 140 may be configured to connect to the chimney 112 (e.g., via a snap-fit arrangement). Alternatively, the flange 140 may be an integrally formed part of the chimney 112. The disc 138 is configured to rotate in a first direction to open the reservoir 110 and to rotate in an opposite second direction to close the reservoir 110.

Figure 6:
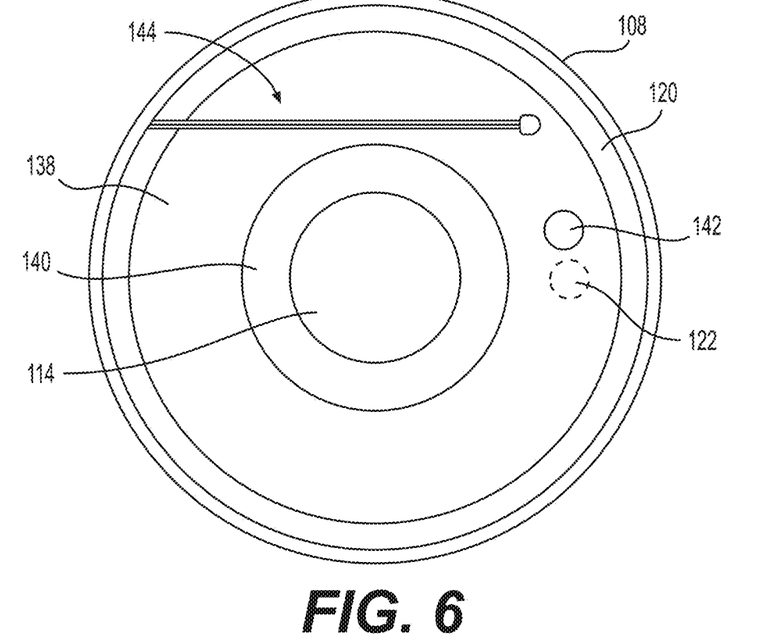
FIG. 6 is an end view of the opening/sealing arrangement of the cartridge section of FIG. 5.

FIG. 6 is an end view of the opening/sealing arrangement of the cartridge section of FIG. 5. Referring to FIG. 6, a bimetallic actuator 144 is attached to the disc 138 to effectuate the pertinent rotation needed to open and close the reservoir 110. The laminate structure of the bimetallic actuator 144 may be as described in connection with the laminate structure of the bimetallic actuator 126. The bimetallic actuator 144 is oriented such that a temperature increase (from the activation of the e-vapor device) will cause an inward bend of the bimetallic actuator 144 and, consequently, a clockwise rotation of the disc 138. As a result of the clockwise rotation, the orifice 142 in the disc 138 will align (or at least overlap) with the aperture 122 to open the reservoir 110 and release the pre-vapor formulation. Conversely, a subsequent temperature decrease (when vaping has ended) will cause a straightening of the bimetallic actuator 144 and, consequently, a counterclockwise rotation of the disc 138 back to its original position (e.g., as shown in FIG. 6). As a result of the counterclockwise rotation, the orifice 142 in the disc 138 will no longer align (or overlap) with the aperture 122, thereby closing the reservoir 110.

Although only one bimetallic actuator 144 is shown in FIG. 6, it should be understood that a second bimetallic actuator may be utilized to provide an additional mechanical force to facilitate the rotation of the disc 138. For example, a second bimetallic actuator may be attached to the disc 138 on the other side of the channel 114 so as to be parallel to the bimetallic actuator 144. In such an instance, the second bimetallic actuator will have the same orientation as the bimetallic actuator 144 so as to bend in the same direction in response to a temperature change.

Figure 7:
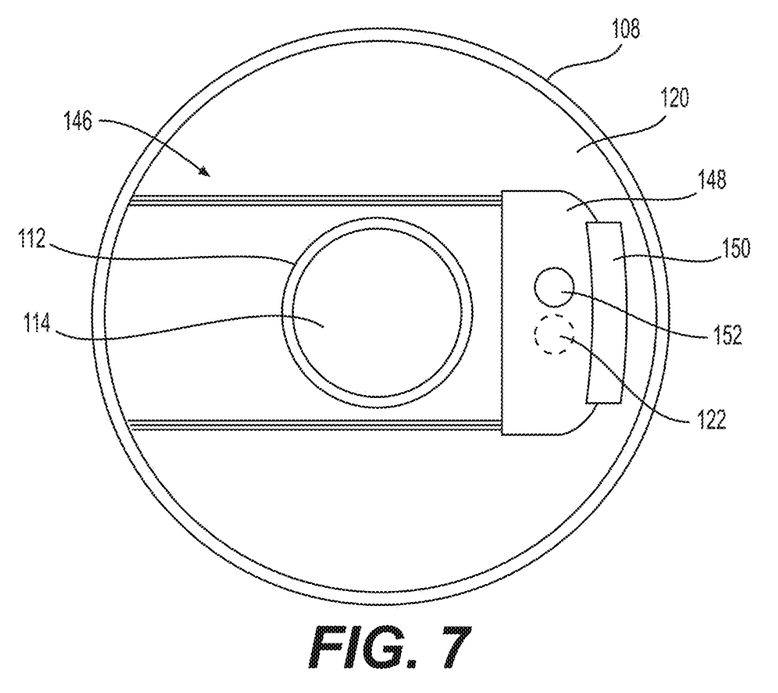
FIG. 7 is an end view of another opening/sealing arrangement of a cartridge section of an e-vapor device according to an example embodiment.

FIG. 7 is an end view of another opening/sealing arrangement of a cartridge section of an e-vapor device according to an example embodiment. Referring to FIG. 7, a pair of bimetallic actuators 146 is secured to a plate 148 designed to undergo a side displacement. As a default, the plate 148 is configured to cover the aperture 122 so as to close the reservoir 110. During vaping, the plate 148 is configured to expose the aperture 122 so as to release the pre-vapor formulation. The plate 148 is engaged with a guide 150 that overlaps a distal edge of the plate 148. In a non-limiting embodiment, the proximal side of the plate 148 (that is adjacent to the bimetallic actuators 146) may be flat, while the distal side may be curved (e.g., a convex surface). In such an instance, the surface of the guide 150 that interfaces with the plate 148 will also be curved (e.g., a concave surface) to correspond to the distal side of the plate 148.

The laminate structure of each of the pair of bimetallic actuators 146 may be as described in connection with the laminate structure of the bimetallic actuator 126. The pair of bimetallic actuators 146 is oriented such that a temperature increase (from the activation of the e-vapor device) will cause the pair of bimetallic actuators 146 to bend and, consequently, cause the plate 148 to shift/slide to one side (e.g., towards the bottom of the page). As a result, the orifice 152 in the plate 148 will align (or at least overlap) with the aperture 122 to open the reservoir 110 and release the pre-vapor formulation. Conversely, a subsequent temperature decrease (when vaping has ended) will cause a straightening of the pair of bimetallic actuators 146 and, consequently, cause the plate 148 to shift/slide back to its original position (e.g., as shown in FIG. 7). As a result, the orifice 152 in the plate 148 will no longer align (or overlap) with the aperture 122, thereby closing the reservoir 110.

Figure 8:
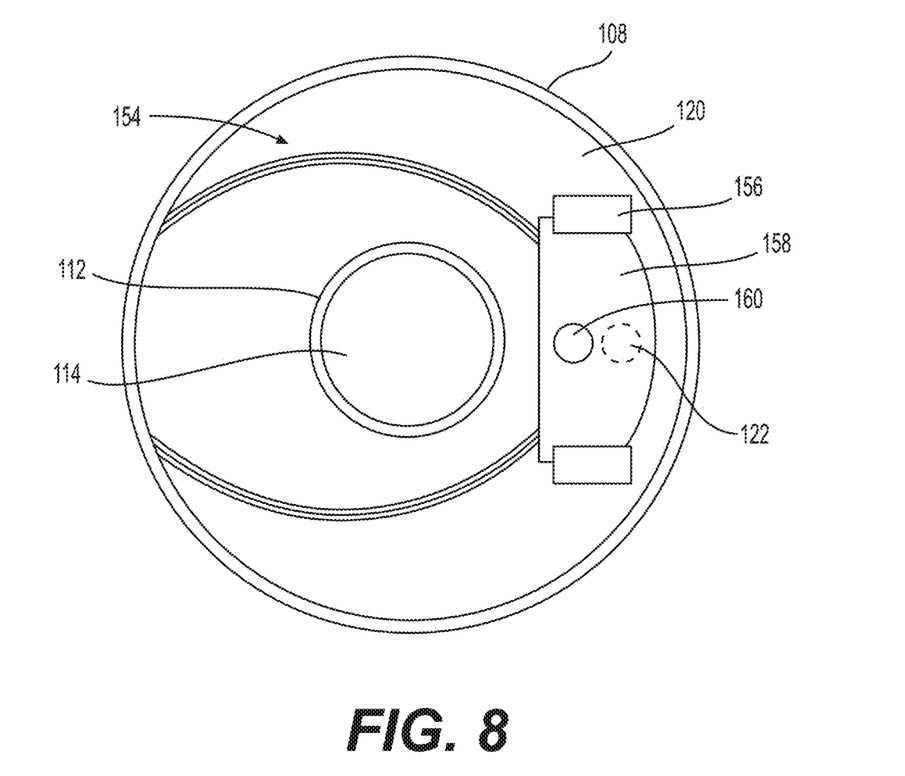
FIG. 8 is an end view of another opening/sealing arrangement of a cartridge section of an e-vapor device according to an example embodiment.

FIG. 8 is an end view of another opening/sealing arrangement of a cartridge section of an e-vapor device according to an example embodiment. Referring to FIG. 8, a pair of bimetallic actuators 154 is secured to a plate 158 designed to undergo a radial displacement (relative to the center of the channel 114). As a default, the plate 158 is configured to cover the aperture 122 so as to close the reservoir 110. During vaping, the plate 158 is configured to expose the aperture 122 so as to release the pre-vapor formulation. The plate 158 is engaged with a pair of guides 156 that overlap the side edges of the plate 158. In a non-limiting embodiment, the proximal side of the plate 158 (that is adjacent to the bimetallic actuators 154) may be flat, while the distal side may be curved (e.g., a convex surface) to correspond to the inner wall of the housing 108.

The laminate structure of each of the pair of bimetallic actuators 154 may be as described in connection with the laminate structure of the bimetallic actuator 126, except that each of the pair of bimetallic actuators 154 has a curved form at an ambient temperature (e.g., with the layer of the material with the higher thermal expansion coefficient being on the inside of the curve). The pair of bimetallic actuators 154 is oriented such that a temperature increase (from the activation of the e-vapor device) will cause the pair of bimetallic actuators 154 to straighten and, consequently, push the plate 158 to shift/slide toward the inner wall of the housing 108. As a result, the orifice 160 in the plate 158 will align (or at least overlap) with the aperture 122 to open the reservoir 110 and release the pre-vapor formulation. Conversely, a subsequent temperature decrease (when vaping has ended) will cause the pair of bimetallic actuators 154 to bend and, consequently, pull the plate 158 to shift/slide back to its original position (e.g., as shown in FIG. 8). As a result, the orifice 160 in the plate 158 will no longer align (or overlap) with the aperture 122, thereby closing the reservoir 110.

Figure 9:
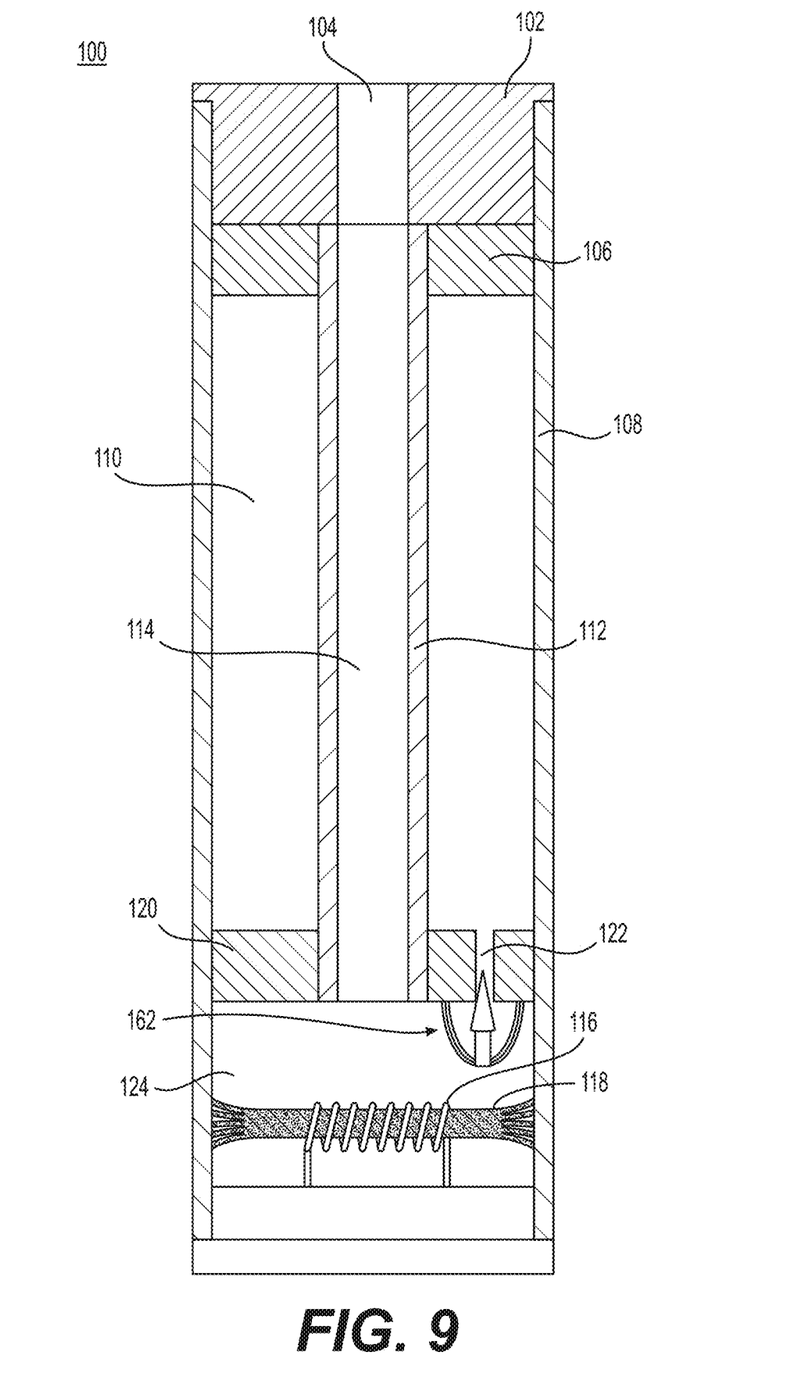
FIG. 9 is a cross-sectional view of another cartridge section of an e-vapor device according to an example embodiment.

FIG. 9 is a cross-sectional view of another cartridge section of an e-vapor device according to an example embodiment. Referring to FIG. 9, a pair of bimetallic actuators 162 is connected to an engagement structure designed to undergo an axial displacement to disengage/reengage with the aperture 122. The engagement structure may be as described in connection with (or analogous to) the previously-discussed engagement portion 132 (e.g., as shown in FIG. 3). As a default, the engagement structure is configured to engage with the aperture 122 so as to close the reservoir 110. During vaping, the engagement structure is configured to disengage from the aperture 122 so as to release the pre-vapor formulation.

The laminate structure of each of the pair of bimetallic actuators 162 may be as described in connection with the laminate structure of the bimetallic actuator 126, except that each of the pair of bimetallic actuators 162 has a curved form at an ambient temperature (e.g., with the layer of the material with the higher thermal expansion coefficient being on the inside of the curve). The pair of bimetallic actuators 162 is oriented such that a temperature increase (from the activation of the e-vapor device) will cause the pair of bimetallic actuators 162 to straighten and, consequently, draw the engagement structure out of the aperture 122, thereby opening the reservoir 110 and releasing the pre-vapor formulation. It should be understood that the engagement structure does not need to be fully unseated from the aperture 122 to release the pre-vapor formulation. For instance, the reservoir 110 may be adequately opened (based on the surface tension of the pre-vapor formulation) even though a portion of the tip of the engagement structure is still within the aperture 122. Conversely, a subsequent temperature decrease (when vaping has ended) will cause the pair of bimetallic actuators 162 to bend and, consequently, insert the engagement structure back into the aperture 122, thereby closing/sealing the reservoir 110. As discussed supra, the tightness of the seal need only be adequate to preclude an outward flow based on the surface tension of the pre-vapor formulation.

Figure 10:
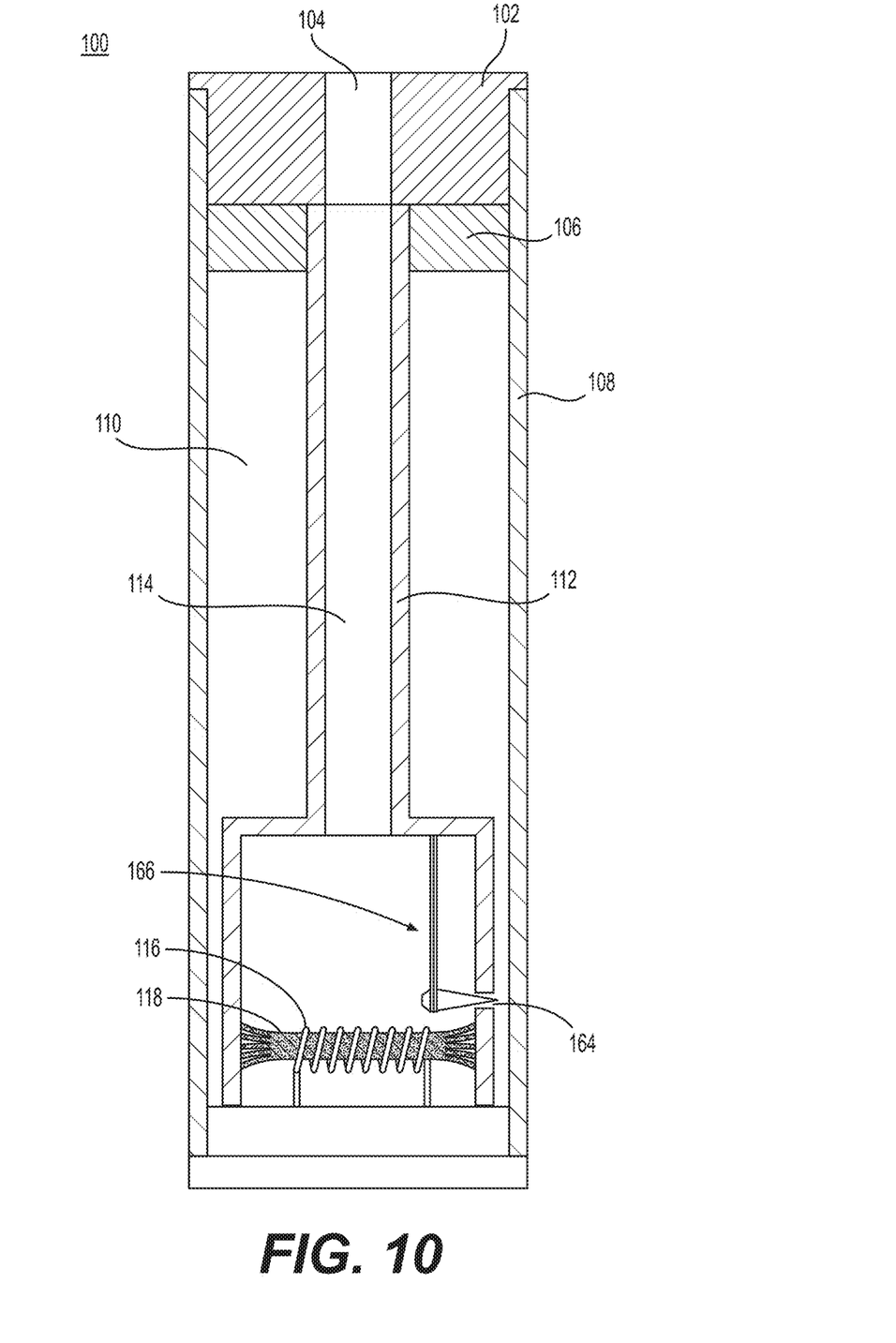
FIG. 10 is a cross-sectional view of another cartridge section of an e-vapor device according to an example embodiment.

FIG. 10 is a cross-sectional view of another cartridge section of an e-vapor device according to an example embodiment. Referring to FIG. 10, a bimetallic actuator 166 is configured to engage with an aperture 164 to seal the reservoir 110 (at an ambient temperature) and to disengage from the aperture 164 to release the pre-vapor formulation (at an elevated temperature). In particular, the bimetallic actuator 166 is oriented such that a temperature increase (from the activation of the e-vapor device) will cause a deflection away from the aperture 164, thereby unsealing the aperture 164 to open the reservoir 110 and release the pre-vapor formulation. Conversely, a subsequent temperature decrease (when vaping has ended) will cause the bimetallic actuator 166 to straighten and, consequently, return to its original position to seal the aperture 164 and close the reservoir 110.

Aside from the different positioning within the cartridge section 100, the bimetallic actuator 166 may be as described in connection with the bimetallic actuator 126. In addition, the bimetallic actuator 166 may be in a form of an insert tailored to be received within the cartridge section 100. Furthermore, the cartridge section 100 in FIG. 10 may be substantially as described in connection with FIG. 2, except for the omission of the second gasket 120. Notably, the chimney 112 in FIG. 10 may be a single, extended structure that defines both the channel 114 and the chamber where the vapor is generated by the heater 116.

Figure 11:
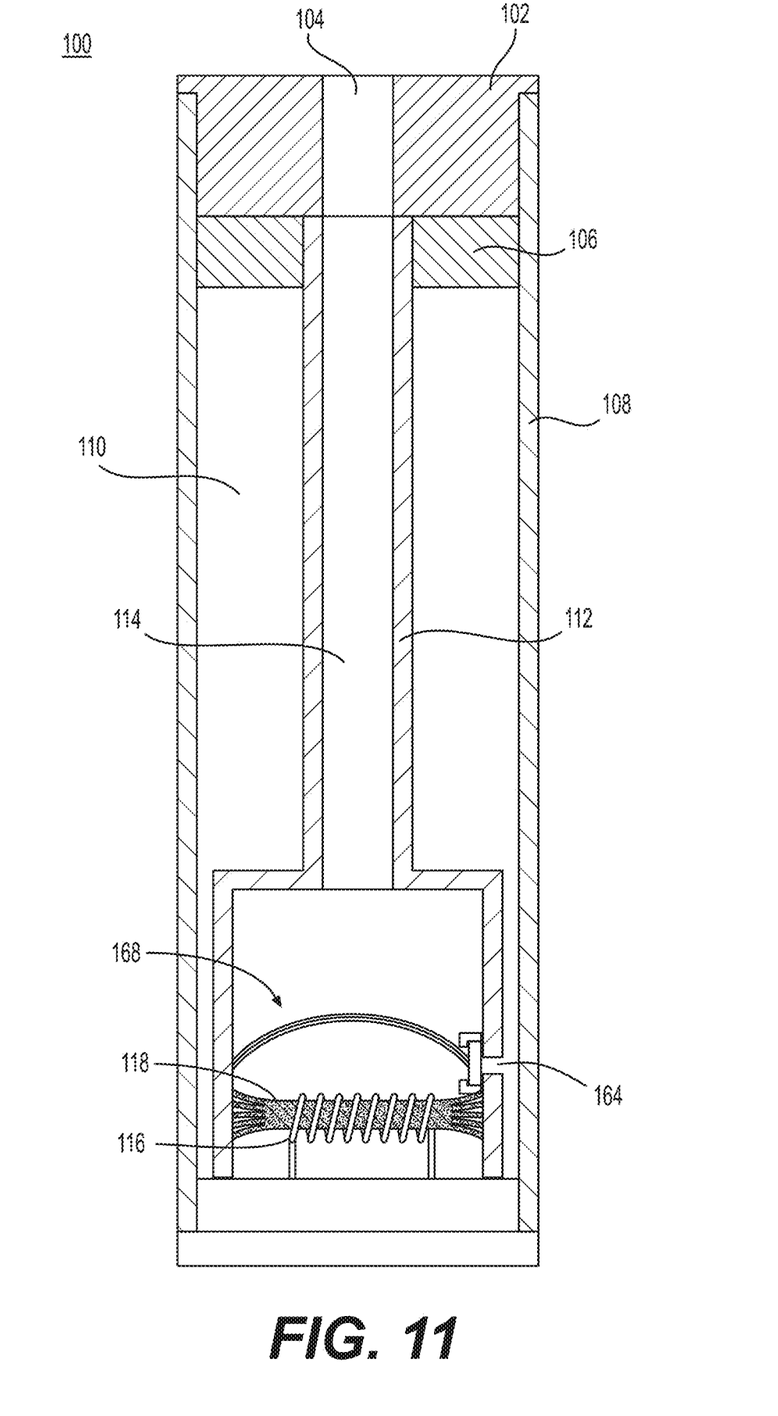
FIG. 11 is a cross-sectional view of another cartridge section of an e-vapor device according to an example embodiment.

FIG. 11 is a cross-sectional view of another cartridge section of an e-vapor device according to an example embodiment. Referring to FIG. 11, a bimetallic actuator 168 is secured to a plate designed to undergo a circumferential displacement along an inner surface of the vapor-generating chamber. As a default, the plate is configured to cover the aperture 164 so as to close the reservoir 110. During vaping, the plate is configured to expose the aperture 164 so as to release the pre-vapor formulation. The plate is engaged with a pair of guides that overlap the side edges of the plate. Aside from being contoured to correspond to the inner, cylindrical sidewalls of the vapor-generating chamber, the plate and guides in FIG. 11 may be substantially as described in connection with the plate 158 and guides 156 in FIG. 8.

The laminate structure of the bimetallic actuator 168 may be as described in connection with the laminate structure of the bimetallic actuator 126, except that the bimetallic actuator 168 has a curved form at an ambient temperature (e.g., with the layer of the material with the higher thermal expansion coefficient being on the inside of the curve). In addition, the bimetallic actuator 168 may be positioned so as to contact the inner, cylindrical sidewalls of the vapor-generating chamber. The bimetallic actuator 168 is oriented such that a temperature increase (from the activation of the e-vapor device) will cause the bimetallic actuator 168 to straighten and, consequently, push the plate (e.g., outward from the page). As a result, the orifice in the plate will align (or at least overlap) with the aperture 164 to open the reservoir 110 and release the pre-vapor formulation. Conversely, a subsequent temperature decrease (when vaping has ended) will cause the bimetallic actuator 168 to bend and, consequently, pull the plate to shift/slide back to its original position. As a result, the orifice in the plate will no longer align (or overlap) with the aperture 164, thereby closing the reservoir 110.

Figure 12:
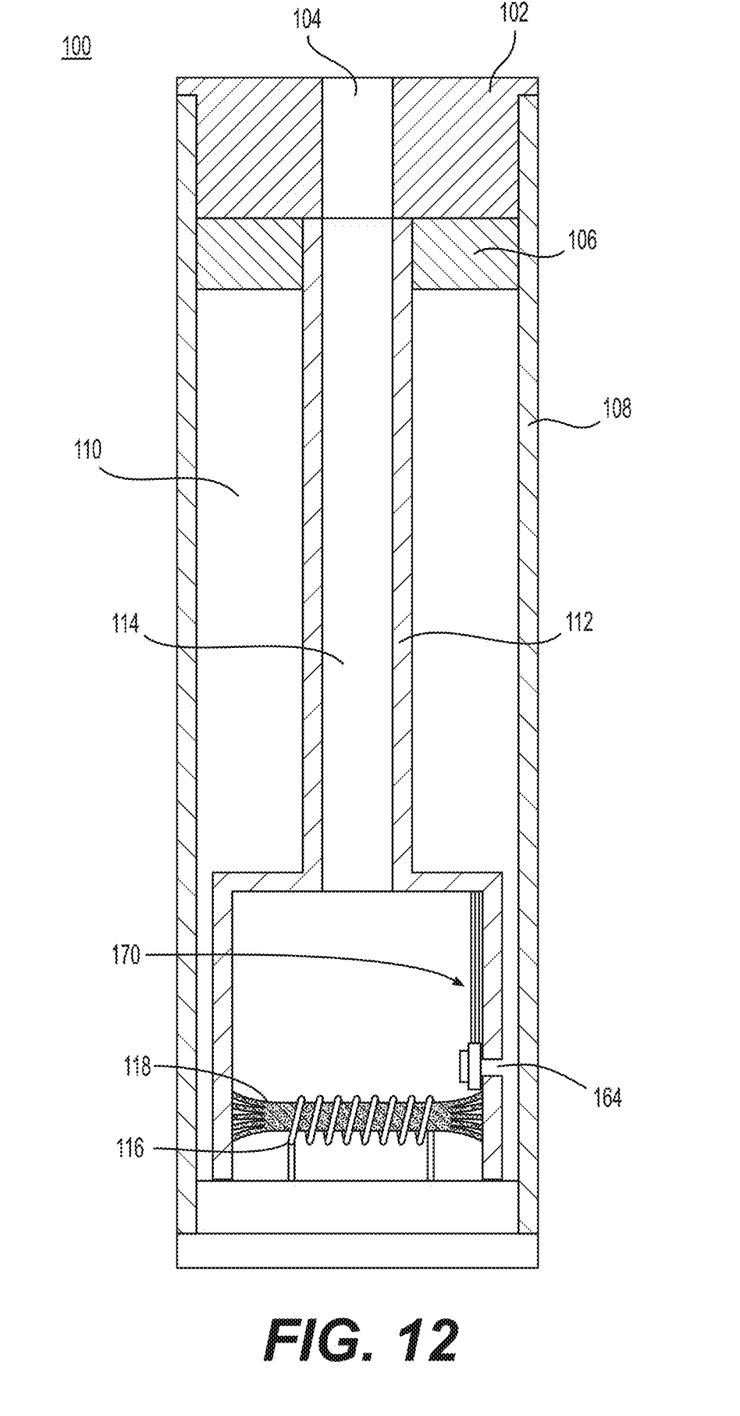
FIG. 12 is a cross-sectional view of another cartridge section of an e-vapor device according to an example embodiment.

FIG. 12 is a cross-sectional view of another cartridge section of an e-vapor device according to an example embodiment. Referring to FIG. 12, a bimetallic actuator 170 (or a pair) is secured to a plate designed to undergo an axial displacement along an inner surface of the vapor-generating chamber. As a default, the plate is configured to cover the aperture 164 so as to close the reservoir 110. During vaping, the plate is configured to expose the aperture 164 so as to release the pre-vapor formulation. The plate is engaged with a pair of guides that overlap the side edges of the plate. Aside from being contoured to correspond to the inner, cylindrical sidewalls of the vapor-generating chamber, the plate and guides in FIG. 12 may be substantially as described in connection with the plate 158 and guides 156 in FIG. 8.

The laminate structure of the bimetallic actuator 170 may be as described in connection with the laminate structure of the bimetallic actuator 126, except that the bimetallic actuator 170 has a curved form at an ambient temperature (e.g., with the layer of the material with the higher thermal expansion coefficient being on the inside of the curve). The bimetallic actuator 170 is oriented such that a temperature increase (from the activation of the e-vapor device) will cause the bimetallic actuator 170 to straighten and, consequently, push the plate downward. As a result, the aperture 164 will be uncovered (at least partially) to open the reservoir 110 and release the pre-vapor formulation. Conversely, a subsequent temperature decrease (when vaping has ended) will cause the bimetallic actuator 170 to return to its original curved form and, consequently, pull the plate back upward to cover the aperture 164, thereby closing the reservoir 110 (e.g., in a manner analogous to FIG. 8).

A method of controlling a flow of pre-vapor formulation in an e-vapor device may include sealing an outlet of a reservoir with a bimetallic actuator, wherein the reservoir is arranged within the e-vapor device and configured to hold the pre-vapor formulation. The method may also include applying a current to the bimetallic actuator to unseal the outlet of the reservoir when vaping is initiated.

In an example embodiment, the applying of the current causes the bimetallic actuator to deflect away from the outlet to unseal the reservoir. The sealing of the outlet of the reservoir may occur in less than a minute from when the vaping has ceased. In another instance, the sealing of the outlet of the reservoir may occur after each puff during the vaping.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An e-vapor device, comprising:
a reservoir, the reservoir configured to hold a pre-vapor formulation, the reservoir defining an outlet configured to release the pre-vapor formulation therefrom;
a heater configured to heat the pre-vapor formulation released from the reservoir to generate a vapor;
a power supply configured to provide a current to the heater; and
a bimetallic actuator including an engagement portion, the bimetallic actuator configured to,
engage the engagement portion with the outlet of the reservoir in response to a first condition, and
disengage the engagement portion from the outlet of the reservoir in response to a second condition.

2. The e-vapor device of claim 1, wherein the power supply is further configured to supply the current to the bimetallic actuator via an electrical lead.

3. The e-vapor device of claim 2, wherein the bimetallic actuator is further configured to bend in a direction away from the outlet in response to the current being supplied to the bimetallic actuator from the power supply.

4. The e-vapor device of claim 2, wherein the bimetallic actuator is further configured to contract in a direction towards the outlet in response to an absence of the current being supplied to the bimetallic actuator from the power supply.

5. The e-vapor device of claim 2, wherein
the first condition is an absence of the current being supplied to the bimetallic actuator; and
the second condition is a presence of the current being supplied to the bimetallic actuator.

6. The e-vapor device of claim 1, wherein the bimetallic actuator is further configured to bend in a direction away from the outlet in response to the current being supplied to the heater from the power supply.

7. The e-vapor device of claim 6, wherein the bimetallic actuator is further configured to contract in a direction towards the outlet in response to an absence of the current being supplied to the heater from the power supply.

8. The e-vapor device of claim 6, wherein
the first condition is an absence of the current being supplied to the heater; and
the second condition is a presence of the current being supplied to the heater.

9. The e-vapor device of claim 1, wherein the outlet is defined on an upstream portion of the reservoir.

10. The e-vapor device of claim 1, wherein the outlet is defined on a lateral surface of the reservoir.

11. The e-vapor device of claim 1, wherein the bimetallic actuator is a laminate structure.

12. The e-vapor device of claim 11, wherein the bimetallic actuator includes at least two materials, the at least two materials having different thermal expansion coefficients.

13. The e-vapor device of claim 1, wherein the engagement portion forms a seal around the outlet of the reservoir in response to the first condition.

14. The e-vapor device of claim 1, wherein the engagement portion is separated from the outlet of the reservoir in response to the second condition.

15. The e-vapor device of claim 1, wherein the engagement portion has a conical or frustoconical shape.

16. The e-vapor device of claim 1, wherein the engagement portion is a plate or a disc.

17. The e-vapor device of claim 16, wherein the bimetallic actuator is further configured to pull the engagement portion away from the outlet in response to the second condition.

18. The e-vapor device of claim 16, wherein the bimetallic actuator is further configured to push the engagement portion towards the outlet in response to the first condition.

19. The e-vapor device of claim 16, wherein the bimetallic actuator is further configured to undergo a circumferential displacement in response to the second condition.

20. The e-vapor device of claim 16, wherein the engagement portion is configured to cover the outlet of the reservoir in response to the first condition.

* * * * *